United States Patent
Jiang et al.

(10) Patent No.: US 9,991,994 B1
(45) Date of Patent: Jun. 5, 2018

(54) METHOD AND TERMINAL DEVICE FOR REDUCING IMAGE DISTORTION

(71) Applicant: Futurewei Technologies, Inc., Plano, TX (US)

(72) Inventors: Hong Jiang, Kernersville, NC (US); Wael Al-Qaq, Oak Ridge, NC (US); Zhihang Zhang, Cary, NC (US); Eric Sung, Greensboro, NC (US)

(73) Assignee: Futurewei Technologies, Inc., Plano, TX (US)

( * ) Notice: Subject to any disclaimer, the term of this patent is extended or adjusted under 35 U.S.C. 154(b) by 0 days. days.

(21) Appl. No.: 15/427,830

(22) Filed: Feb. 8, 2017

(51) Int. Cl.
 *H04L 27/16* (2006.01)
 *H04L 1/20* (2006.01)

(52) U.S. Cl.
 CPC .............. *H04L 1/205* (2013.01); *H04L 27/16* (2013.01)

(58) Field of Classification Search
 CPC ................................ H04L 1/205; H04L 27/16
 USPC ........................................................ 375/226
 See application file for complete search history.

(56) References Cited

U.S. PATENT DOCUMENTS

| 9,130,626 B2 | 9/2015 | Gotman et al. | |
|---|---|---|---|
| 9,602,079 B2 * | 3/2017 | Ranjan | H03H 11/1291 |
| 2004/0038649 A1 * | 2/2004 | Lin | H04B 1/30 |
| | | | 455/130 |
| 2016/0233916 A1 * | 8/2016 | Weng | H04B 1/0475 |

* cited by examiner

*Primary Examiner* — Michael Neff
(74) *Attorney, Agent, or Firm* — Futurewei Technologies, Inc.

(57) ABSTRACT

A method and terminal device for reducing an image distortion are provided. The terminal device generates a radio frequency signal from a first path that includes first and second low pass filters of in-phase and quadrature phase paths, produces a decomposed signal having in-phase and quadrature phase components in digital form based on the radio frequency signal, and determines a phase mismatch between the in-phase and quadrature phase components. Then the terminal device generates a bandwidth adjustment value based on the determined phase mismatch, further generates, based on the bandwidth adjustment value, first and second bandwidth control signals; and adjusts a bandwidth of first and second low pass filters based on the first and second bandwidth control signals to reduce the phase mismatch.

16 Claims, 12 Drawing Sheets

METHOD AND TERMINAL DEVICE FOR REDUCING IMAGE DISTORTION

TECHNICAL FIELD

The present invention relates to a telecommunication system. In particular, it relates to a method and terminal device for reducing an image distortion.

BACKGROUND

In a wireless terminal, e.g., cell phone, an image distortion is a key impairment that impacts qualities of a transmitting signal or a receiving signal. The image distortion comprises a frequency based distortion.

Typically, a frequency independent image is a dominant factor and is commonly corrected through calibration in a communication system. There are many articles and references that reflect a focus on reducing the frequency independent image. These efforts reduce frequency based distortion. However, as the demand of higher data throughput increases, however, there is a need to further reduce distortion.

SUMMARY

An aspect of the embodiments of the present invention is to provide a method and a circuit for a wireless terminal for reducing an image distortion, in particular, for reducing a frequency dependent image distortion. In a first aspect, a terminal device generates a radio frequency signal from a first path that includes first and second low pass filters of in-phase and quadrature phase paths, respectively; the terminal device produces a decomposed signal having in-phase and quadrature phase components in digital form based on the radio frequency signal; the terminal device determines, in digital processing circuitry, a phase mismatch between the in-phase and quadrature phase components; the terminal device generates a bandwidth adjustment value based on the determined phase mismatch; the terminal device generates, based on the bandwidth adjustment value, first and second bandwidth control signals; and the terminal device adjusts a bandwidth of first and second low pass filters based on the first and second bandwidth control signals to reduce the phase mismatch.

Optionally, the step of adjusting the bandwidth comprises: separately switching-off or switching on, based on the first and second bandwidth control signals respectively corresponding to the first and second low pass filters, at least one of a plurality of parallel connected capacitances in the first and second low pass filters to adjust the bandwidth of each of first and second low pass filters.

Optionally, the first path is a transmit path in a transmitter of the terminal device, the radio frequency signal is an outgoing signal of the transmitter of the terminal device, and the decomposed signal is a feedback signal of the radio frequency signal, wherein the step of producing the decomposed signal comprises: producing, from a second path, the decomposed feedback signal having the in-phase and quadrature phase components in digital form based on the outgoing radio frequency signal, wherein the second path is a receive path in the transmitter of the terminal device.

Optionally, the step of generating the radio frequency signal comprises: transforming first analog and second analog sources into first digital and second digital signals respectively; filtering the first digital and second digital signals by the first and second low pass filters respectively to obtain the in-phase and quadrature phase transmit paths; generating a radio frequency analog signal by combining the in-phase and quadrature transmit paths; and outputting the outgoing radio frequency signal by amplifying and filtering the radio frequency analog signal.

Optionally, the first path is a receive path in a receiver of the terminal device, and the radio frequency signal is generated by a signal source in the receiver of the terminal device, wherein the step of producing the decomposed signal comprises: producing, from the receive path, the decomposed signal having the in-phase and quadrature phase components in digital form based on the radio frequency signal.

Optionally, the step of producing the decomposed signal comprises: decomposing the radio frequency signal into in-phase and quadrature phase receive paths; generating in-phase and quadrature phase analog signals by filtering the in-phase and quadrature phase receive paths by the first and second low pass filters of in-phase and quadrature phase paths, respectively; and producing the decomposed signal having the in-phase and quadrature phase components in the digital form based on the in-phase and quadrature phase analog signals. [0001] In a second aspect, a terminal device comprises: a first circuitry comprising first and second low pass filters of in-phase and quadrature phase paths, respectively, and a digital base band circuitry coupled with the first circuitry, wherein the first circuitry is configured to: generate a radio frequency signal from a first path that includes the in-phase and quadrature phase paths, respectively.

The digital base band circuitry is configured to: produce a decomposed signal having in-phase and quadrature phase components in digital form based on the radio frequency signal; determine a phase mismatch between the in-phase and quadrature phase components; generate a bandwidth adjustment value based on the determined phase mismatch; and generate, based on the bandwidth adjustment value, first and second bandwidth control signals; and the first and second low pass filters are configured to: receive the first and second bandwidth control signals respectively, and respectively adjust a bandwidth of the first and second low pass filters to reduce the phase mismatch based on the first and second bandwidth control signals.

Optionally, each of the first and second low pass filters comprise a plurality of parallel connected capacitances, and at least one capacitance of the plurality of the parallel connected capacitances connected with one switch or two switches on both side of the at least one capacitance in series, wherein the first and second low pass filters are configured to: switch-on or switch-off, based on the first and second bandwidth control signals respectively corresponding to the first and second low pass filters, one switch or two switches connected with the at least one of a plurality of parallel connected capacitances in the first and second low pass filters to adjust the bandwidth of each of first and second low pass filters.

Optionally, the first circuitry is a transmitting circuitry, the first path is a transmit path in a transmitter of the terminal device, the radio frequency signal is an outgoing signal of the transmitter of the terminal device, and the decomposed signal is a feedback signal of the radio frequency signal, wherein the digital base band circuitry is configured to produce the decomposed signal as follows: producing, from a second path, the decomposed feedback signal having the in-phase and quadrature phase components in digital form based on the outgoing radio frequency signal, wherein the second path is a receive path in the transmitter of the terminal device.

Optionally, the transmitting circuitry further comprises: first and second analog to digital converter, and a combining circuitry, wherein the first analog to digital converter coupled with the first low pass filter, and the second analog to digital converter coupled with the second low pass filter, and the first and second low pass filters are coupled with the combining circuitry, wherein the first and second analog to digital converter are configured to transform first analog and second analog sources into first digital and second digital signals respectively;

the first and second low pass filters are configured to filter the first digital and second digital signals respectively to obtain the in-phase and quadrature phase transmit paths; and the combining circuitry is configured to generate a radio frequency analog signal by combining the in-phase and quadrature transmit paths; and the transceiver further comprises an amplifier coupled with a third filter, wherein the transmitting circuitry is coupled with the amplifier, wherein the amplifier is configured to amplify the radio frequency analog signal; and the third filter is configured to generate the outgoing radio frequency signal by filtering the amplified radio frequency analog signal.

Optionally, the first path is a receive path in a receiver of the terminal device, the first circuitry is a receiving circuitry which comprises first and second mixers corresponding to the in-phase and quadrature phase paths respectively, the first mixer is coupled to the first low pass filter of in-phase paths, the second mixer is coupled to the second low pass filter of quadrature phase path, and the radio frequency signal is generated from a signal generated by a signal source in the receiver of the terminal device, wherein the first circuitry is configured to generate the radio frequency signal as follows: the first and second mixers respectively generating in-phase and quadrature phase radio frequency signals; and producing, by the first and second low pass filters respectively from the receive path, the radio frequency signal having the in-phase and quadrature phase components based on the in-phase and quadrature phase radio frequency signals.

Optionally, the digital base band circuitry comprises first and second analog to digital converters respectively corresponding to the in-phase and quadrature phase components; the digital base band circuitry is configured to produce the decomposed signal as follows: producing, by the first and second analog to digital converters from the receive path, the decomposed signal having the in-phase and quadrature phase components in digital form based on the in-phase and quadrature phase radio frequency signals.

The terminal device above generates two bandwidth (bandwidth) control signals based on the bandwidth adjustment value, namely, first and second bandwidth control signals. The two bandwidth control signals are input into the two low pass filters (LPFs) in in-phase path and quadrature path respectively. And the two LPFs adjust its bandwidth based on the input bandwidth control signal independently to reduce the bandwidth difference between the two LPFs, and further reduce the phase mismatch. In addition, the two LPFs adjust its bandwidth independently, thereby the adjustment is flexible and the digital baseband processor can control the two LPFs flexibly.

In a third aspect, a method in a terminal device comprises: the terminal device generates a radio frequency signal from a first path that includes in-phase and quadrature phase low pass filters of in-phase and quadrature phase paths, respectively; the terminal device produces a decomposed signal having in-phase and quadrature phase components in digital form based on the radio frequency signal; the terminal device determines, in digital processing circuitry, a phase mismatch between the in-phase and quadrature phase components; the terminal device generates a bandwidth adjustment value based on the determined phase mismatch; the terminal device generates, based on the bandwidth adjustment value, a first control signal; and the terminal device adjusts a bandwidth of a first low pass filter to reduce the phase mismatch based on the first bandwidth control signal, wherein the first low pass filter is one of the in-phase and quadrature phase low pass filters.

Optionally, the step of adjusting the bandwidth comprises switching-off or switching on, based on the first control signal, at least one of a plurality of parallel connected capacitances in the first low pass filter to adjust the bandwidth of the first low pass filter.

Optionally, the method may further comprises: the terminal device adjusts a bandwidth of a second low pass filter to reduce the phase mismatch based on the first bandwidth control signal, wherein the second low pass filter is another one of the in-phase and quadrature phase low pass filters.

Optionally, the step of adjusting the bandwidth comprises: switching-off or switching on, based on the first control signal, at least one of a plurality of parallel connected capacitances in the second low pass filter to adjust the bandwidth of the first low pass filter.

Optionally, the first path is a transmit path in a transmitter of the terminal device, the radio frequency signal is an outgoing signal of the transmitter of the terminal device, and the decomposed signal is a feedback signal of the radio frequency signal, wherein the step of producing the decomposed signal comprises: producing, from a second path, the decomposed feedback signal having the in-phase and quadrature phase components in digital form based on the outgoing radio frequency signal, wherein the second path is a receive path in the transmitter of the terminal device.

Optionally, the step of generating the radio frequency signal comprises:

transforming first analog and second analog sources into first digital and second digital signals respectively;

filtering the first digital and second digital signals by the first and second low pass filters respectively to obtain the in-phase and quadrature phase transmit paths;

generating a radio frequency analog signal by combining the in-phase and quadrature transmit paths; and outputting an outgoing radio frequency signal by amplifying and filtering the radio frequency analog signal.

Optionally, the first path is a receive path in a receiver of the terminal device, and the radio frequency signal is generated by a signal source in the receiver of the terminal device, wherein the step of producing the decomposed signal comprises: producing, from the receive path, the decomposed signal having the in-phase and quadrature phase components in digital form based on the radio frequency signal.

Optionally, the step of producing the decomposed signal comprises:

decomposing the radio frequency signal into in-phase and quadrature phase receive paths;

generating in-phase and quadrature phase analog signals by filtering the in-phase and quadrature phase receive paths by the first and second low pass filters of in-phase and quadrature phase paths, respectively; and producing the decomposed signal having the in-phase and quadrature phase components in the digital form based on the in-phase and quadrature phase analog signals.

In a fourth aspect, a terminal device comprises: a first circuitry comprising in-phase and quadrature phase low pass filters of in-phase and quadrature phase paths, respectively, and a digital base band circuitry coupled with the first circuitry, wherein the first circuitry is configured to: generate a radio frequency signal from a first path that includes the in-phase and quadrature phase paths, respectively;

the digital base band circuitry is configured to:

produce a decomposed signal having in-phase and quadrature phase components in digital form based on the outgoing radio frequency signal;

determine a phase mismatch between the in-phase and quadrature phase components;

generate a bandwidth adjustment value based on the determined phase mismatch; and generate, based on the bandwidth adjustment value, a first control signal;

a first low pass filter is configured to: adjust a bandwidth of the first low pass filter to reduce the phase mismatch based on the first bandwidth control signal, wherein the first low pass filter is one of the in-phase and quadrature phase low pass filters.

Optionally, the first low pass filter comprises a plurality of parallel connected capacitances, and at least one capacitance of the plurality of the parallel connected capacitances connected with one switch or two switches on both side of the at least one capacitance in series, wherein the first low pass filter is configured to: switch-on or switch-off, based on the first bandwidth control signal, the one switch or two switches connected with the at least one of a plurality of parallel connected capacitances in the first low pass filter to adjust the bandwidth of the first low pass filter.

Optionally, a second low pass filter is configured to: adjust a bandwidth of the second low pass filter to reduce the phase mismatch based on the first bandwidth control signal, wherein the second low pass filter is another one of the in-phase and quadrature phase low pass filters.

Optionally, the second low pass filter comprises a plurality of parallel connected capacitances, and at least one capacitance of the plurality of the parallel connected capacitances connected with one switch or two switches on both side of the at least one capacitance in series, wherein the second low pass filter is configured to: switch-on or switch-off, based on the first control signal, the one switch or two switches connected with the at least one of a plurality of parallel connected capacitances in the second low pass filter to adjust the bandwidth of the second low pass filter.

Optionally, the first circuitry is a transmitting circuitry, the first path is a transmit path in a transmitter of the terminal device, and the radio frequency signal is an outgoing signal of the transmitter of the terminal device, wherein the digital base band circuitry is configured to produce the decomposed signal as follows: producing, from a second path, the decomposed feedback signal having the in-phase and quadrature phase components in digital form based on the outgoing radio frequency signal, wherein the second path is a receive path in the transmitter of the terminal device.

Optionally, the transmitting circuitry further comprises: first and second analog to digital converter, and a combining circuitry, wherein the first analog to digital converter coupled with the first low pass filter, and the second analog to digital converter coupled with the second low pass filter, and the first and second low pass filters are coupled with the combining circuitry, wherein the first and second analog to digital converter are configured to transform first analog and second analog sources into first digital and second digital signals respectively;

the first and second low pass filters are configured to filter the first digital and second digital signals respectively to obtain the in-phase and quadrature phase transmit paths; and the combining circuitry is configured to generate a radio frequency analog signal by combining the in-phase and quadrature transmit paths; and the transceiver further comprises an amplifier coupled with a third filter, wherein the transmitting circuitry is coupled with the amplifier, wherein the amplifier is configured to amplify the radio frequency analog signal; and the third filter is configured to generate the outgoing radio frequency signal by filtering the amplified radio frequency analog signal.

Optionally, the first path is a receive path in a receiver of the terminal device, the first circuitry is a receiving circuitry which comprises first and second mixers corresponding to the in-phase and quadrature phase paths respectively, the first mixer is coupled to the first low pass filter of in-phase paths, the second mixer is coupled to the second low pass filter of quadrature phase path, and the radio frequency signal is generated from a signal generated by a signal source in the receiver of the terminal device, wherein the first circuitry is configured to generate the radio frequency signal as follows:

the first and second mixers respectively generating in-phase and quadrature phase radio frequency signals; and producing, by the first and second low pass filters respectively from the receive path, the radio frequency signal having the in-phase and quadrature phase components based on the in-phase and quadrature phase radio frequency signals.

Optionally, the digital base band circuitry comprises first and second analog to digital converters respectively corresponding to the in-phase and quadrature phase components;

the digital base band circuitry is configured to produce the decomposed signal as follows: producing, by the first and second analog to digital converters from the receive path, the decomposed signal having the in-phase and quadrature phase components in digital form based on the in-phase and quadrature phase radio frequency signals.

The terminal device above generates one bandwidth (bandwidth) control signals based on the bandwidth adjustment value, namely, first bandwidth control signal. The bandwidth control signal is input into one of or both of the low pass filters (LPFs) in in-phase path and quadrature path respectively. And the one LPF or both two LPFs adjust its bandwidth based on the one bandwidth control signal to reduce the bandwidth difference between the two LPFs, and further reduce the phase mismatch, which is simply to implement compared with the above first and second aspects.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present embodiments of the invention address ways to further reduce image distortion to support use of higher order modulation schemes, e.g., uplink 256 quadrature amplitude modulation (256QAM. Typically, there are two types of image distortion: Frequency independent image distortion and frequency dependent distortion. With higher order modulation schemes, frequency dependent image distortion may become a dominant factor, which means a frequency dependent image distortion correction/calibration method is needed to achieve low image distortion. In the past, most efforts to reduce distortion have been directed to frequency independent distortion.

In one embodiment of the invention, a phase correction apparatus for correcting the phase imbalance of a differential buffer of a quadrature generator is presented. The embodiment of the invention may also be applied, however, to a variety of radio frequency devices. Hereinafter, various embodiments will be explained in detail with reference to the accompanying drawings.

In a double-sideband transmitter or receiver, the upper-sideband signal can show up at the lower-sideband, and vice-versa, and thus create distortion to a desired signal. This distortion is typically referred as an image distortion. This image distortion is generated by gain and phase mismatch between I path and Q paths in the transmitter or receiver. Frequency independent image distortion refers to image distortion that is independent of signal frequency. A wireless or wired terminal normally has a correction mechanism to reduce the frequency independent image distortion.

Figure 1:
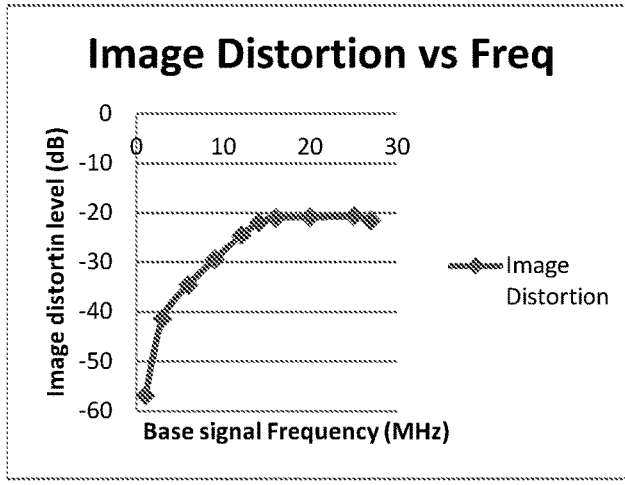
FIG. 1 shows the relationship between the frequency dependent image distortion and the base band signal frequency.

Embodiments of the present invention focus on the frequency dependent image distortion. FIG. 1 shows the relationship between the frequency dependent image distortion and the base band signal frequency. It can be seen that the level of the frequency dependent image distortion changes with regards to the base band signal frequency. Since the frequency dependent image distortion limits the achievable signal quality, the frequency dependent image distortion becomes a critical issue. As the demand of high data throughput increases in the cellular system, it is highly desirable to have an effective way to correct the frequency dependent image distortion.

Embodiments of present invention for a communication system of comprise a terminal device and a base station. The terminal device could be at a transmitting side or at a receiving side, and thus, the terminal device is also called a transmitter or a receiver in embodiments of the present invention. In addition, the terminal device could be a wireless terminal or a wired terminal. Embodiments of the present invention use the wireless terminal as an example to illustrate, but it is not limited to the wireless terminal.

The wireless terminal may employ different communication protocols. For example, the wireless terminal may comprises a cell phone in a long term evolution (LTE) system, a 3G system, a 2G system, or a 5G system, etc. Also, the wireless terminal could be a personal digital assistant (PDA), a laptop, or other devices have similar functions that is configured to communicate wirelessly.

In a typical quadrature transmitter or receiver, the biggest frequency dependent image distortion is from mismatch of low pass filters (LPFs). The mismatch of LPFs can be attributed to in-phase (I) path LPF and quadrature phase (Q) path having different bandwidths. The embodiments described herein are characterized by employing bandwidth control to reduce the difference between the bandwidths of the I path LPF and the Q path LPF, thus reducing the frequency dependent image distortion. Embodiments of the present invention provides a plurality of methods and wireless terminals to reduce the difference between the bandwidths of the I path LPF and the Q path LPF, thus reducing the frequency dependent image distortion level.

Figure 2:
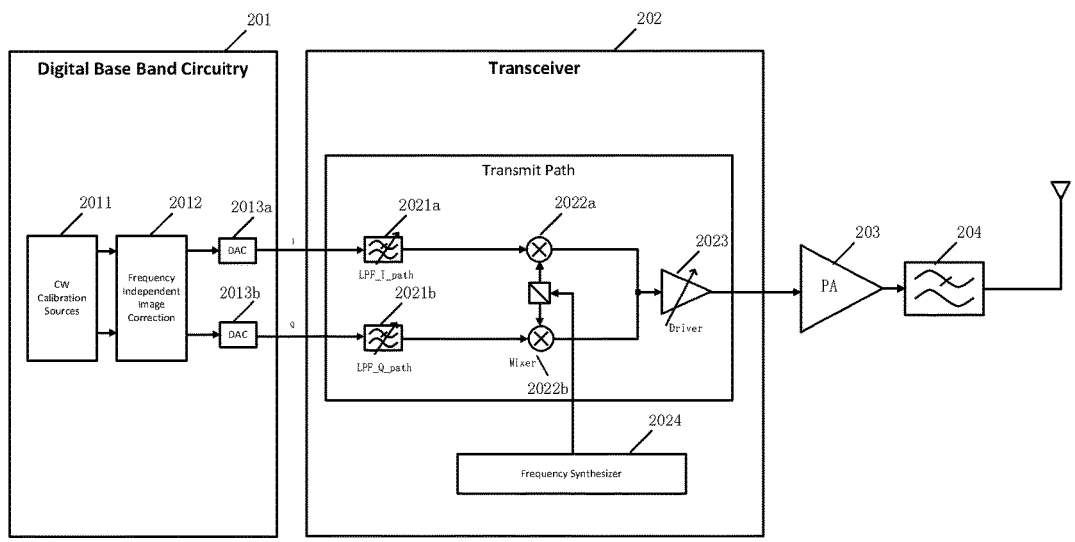
FIG. 2 shows an illustrative structure of a transmitter in a wireless terminal applied in an embodiment of the present invention.

FIG. 2 shows an illustrative structure of a transmitter in a wireless terminal applied in an embodiment of the present invention. The transmitter comprises digital base band circuitry 201, a transceiver 202, a power amplifier 203, and a filter 204. The digital base band circuitry 201 could comprise a continuous wave (CW) calibration source 2011, a frequency independent image correction element 2012, and digital-to-analog converters (DACs) 2013a and 2013b, in which one (2013a) is for an I path, and the other (2013b) is for a Q path. The transceiver 202 comprises a transmit path for the I and Q paths. In the transmit path, the transceiver 202 comprises two low pass filters (LPFs) 2021, in which one (2021a) is for the I path, and the other (2021b) is for the Q path, two mixers 2022a and 2022b, a driver 2023, and a frequency synthesizer 2024.

In the transmitter, the continuous wave calibration source 2011 generates a source signal, wherein the source signal can be a predefined continuous wave signal for factory calibration purpose. The frequency independent image correction element 2012 performs frequency independent image correction on the source signal. The DACs 2013a and 2014b respectively convert the corrected signal into an analog signal for I and Q paths of the transceiver 202. The I path LPF 2021a filters the I path analog signal and the Q path LPF 2021b filters the Q path analog signal. The frequency synthesize 2024 generates a carrier frequency signal and the carrier frequency signal is shifted in phase to 90 degree and 0 degree (not shifted) respectively and then the mixers 2022a and 2022b respectively modulates the I path analog signal and the Q path analog signal with the shifted carrier frequency signal to obtain upconverted I path and Q path radio frequency signals. The driver 2023 combines the I path and Q path radio frequency signals. The PA 203 amplifies the combined radio frequency signal, the filter 204 filters the radio frequency signal, and then an antenna transmits the radio frequency signal.

Figure 3:
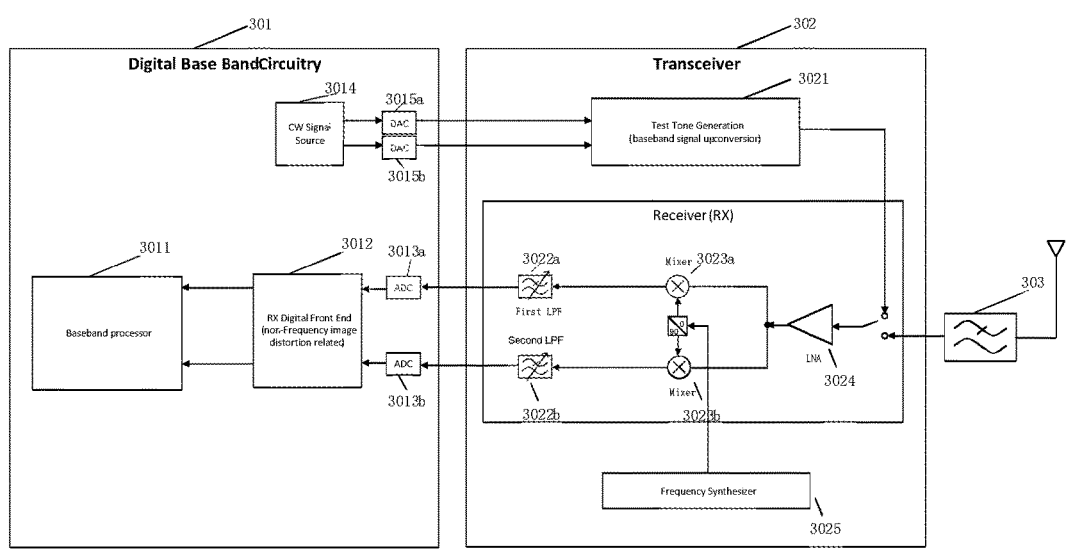
FIG. 3 shows an illustrative structure of a receiver in a wireless terminal applied in an embodiment of the present invention.

FIG. 3 shows an illustrative structure of a receiver in a wireless terminal applied in an embodiment of the present invention. The receiver comprises similar components as that in the transmitter, as shown in FIG. 3. A radio frequency signal is received through an antenna, and then is filtered by a filter 303. The filtered radio frequency is amplified by a low-noise amplifier (LNA) 3024, and then is demodulated into I path signal and Q path signal by the mixer 3023a and mixer 3023b respectively. The I path signal and Q path signal are respectively filtered by the LPF 3022a and LPF 3022b. Then the filtered I path signal and Q path signal are converted into digital form by analog-to-digital converters (ADC) 3013a and 3013b. Then the filtered I path signal and Q path signal are then processed by the receiving digital front end and base band processor etc.

It should be mentioned that not all the components in above wireless terminal are necessary, and some of them could be optional. A person skilled in the art could choose the components as necessary.

In addition, for correction control, the receiver further comprises a transmitting path, and a continuous wave (CW) signal source 3014. The continuous wave signal source 3014 generates a digital source signal. The source signal is then converted by DAC 3015a and DAC 3015b into analog form to obtain analog base band I path signal and Q path signal respectively. In the transmitting path, the analog base band I path signal and Q path signal are up converted to obtain a radio frequency signal. Then the radio frequency signal is input into the LNA 3024.

Figure 4:
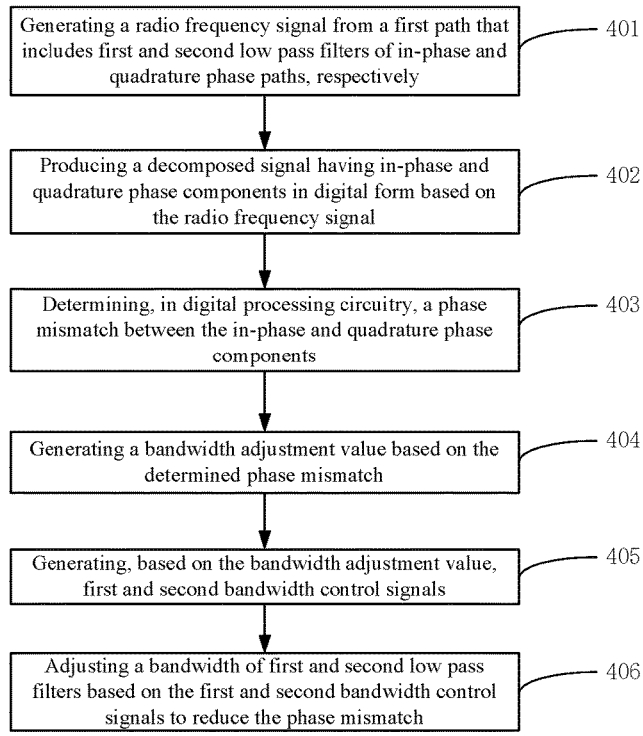
FIG. 4 shows an illustrative flow chart of a method in a first embodiment.
Figure 5:
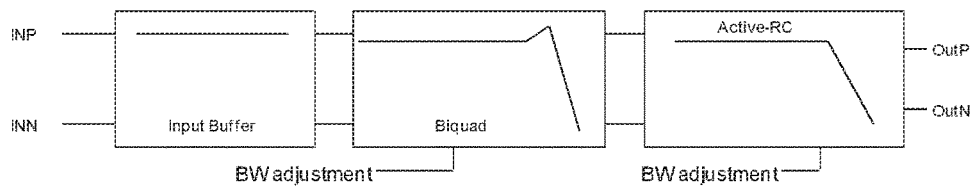
FIG. 5 shows an illustrative flow chart of an implementation manner of step 401 in FIG. 4.
Figure 6:
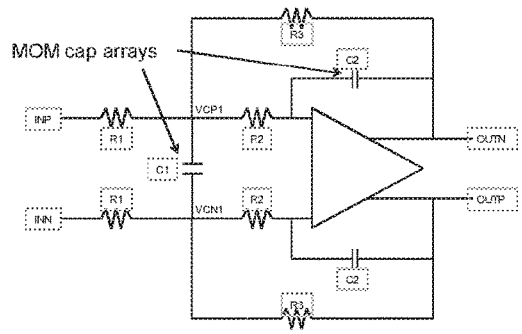
FIG. 6 shows an illustrative flow chart of a further implementation manner of step 401 in FIG. 4.

Embodiments of present invention improve the above transmitter and receiver by adding a component to control the bandwidth of at least one of the LPFs in the I path and Q path to reduce the dependent image distortion. FIGS. 4 to 6 show illustrative flow charts at a wireless terminal based on the first embodiment of the present invention. The wireless terminal in FIG. 4 could be a transmitter or a receiver in first embodiment. The method shown in FIG. 4 comprises the following steps:

Step 401: A wireless terminal generates a radio frequency signal from an analog transmit path that includes first and second low pass filters of in-phase and quadrature phase paths, respectively. In an implementation example, an outgoing digital signal is converted to a continuous waveform and, as a part of the analog transmit path processing, is produced to in-phase and quadrature phase path low pass filters. The quadrature and in phase path signals are upconverted to radio frequency and are eventually combined and power amplified for transmission from an antenna. The radio frequency signal is then produced back to receive path processing circuitry for analysis and distortion correction. While this particular embodiment is directed to transmit processing for a transceiver, the concepts may be applied to receive path processing as well for a receiver or transceiver.

Step 402: The wireless terminal produces a decomposed signal based on the outgoing radio frequency signal having in-phase and quadrature phase components in digital form. The decomposed signal is a feedback signal of the outgoing radio frequency signal when this particular embodiment is directed to transmit processing. Alternatively, Step 402 of producing the decomposed signal may comprise the wireless terminal producing, from the receive path, the decomposed signal having the in-phase and quadrature phase components in digital form based on a received radio frequency signal. For the receiver path, a continuous wave (CW) signal generated by the continuous wave (CW) signal source 3014 is converted into I path analog signal and Q path analog signal and then the I path analog signal and Q path analog signal are produced to in-phase and quadrature phase path low pass filters. Then the filtered signals are produced to digital base band circuitry for analysis and distortion correction.

Step 403: The wireless terminal determines, in digital processing circuitry, a phase mismatch between the in-phase and quadrature phase components. Any known digital processing method for determining phase mismatch may be used. Alternatively, any known analog process for generating an error signal based on a phase mismatch may be used wherein the error signal is produced to the digital base band circuitry for processing to generate control signals to reduce the phase mismatch produced by the in-phase and quadrature phase LNAs.

Step 404: The wireless terminal generates a bandwidth adjustment value based on the determined phase mismatch. As stated in the previous paragraph, the phase mismatch may be determined in a number of ways. The bandwidth adjustment value is correspondingly determined.

In present embodiment, in Step 403, the wireless terminal determines a phase mismatch between the in-phase and quadrature phase components, and in Step 404, the wireless terminal generates a bandwidth adjustment value based on the determined phase mismatch. As it analyzed above, embodiments of present invention focus on reducing the phase mismatch that causes the frequency dependent image distortion, and the phase mismatch mainly caused by the bandwidth difference between the LPFs in I path and Q path respectively.

Therefore, the present embodiments provide for the I path and Q path bandwidth of the LPFs to be independently controlled, which enables the LPF at one of the I path and Q path have the similar bandwidth as the other one of the I path and Q path, thus reducing the bandwidth mismatch which is the dominant contributor for frequency dependent image distortion.

It is found that although the bandwidth difference between the two LPFs on the I path and Q path is small because both LPFs are physically located on the same chip. However the small bandwidth difference still causes the problem because the signal quality requirement is very high when the data throughput requirement is high. When the bandwidth difference is small, linear approximation can be used in the calibration process to simply to procedure and reduce the calibration time.

In order to realize the bandwidth adjustment, embodiments of present invention also provide a method for generating, based on the bandwidth adjustment value, first and second bandwidth control signals.

The base band processor can comprise an IQ path bandwidth adjustment estimator which estimates the IQ path bandwidth adjustment value needed through a factory calibration process using continuous wave (CW) tones. The calibration result is used to control the transceiver I and Q path bandwidth accordingly during real operation so that the frequency dependent image distortion level is minimized.

That is, the wireless terminal can obtain a calibration result, denoted as an IQ path LPF bandwidth adjustment value. When the digital base band processor determines the phase mismatch between the in-phase and quadrature phase components, the digital base band processor can further decides the bandwidth adjustment control signal based on the determined phase mismatch using linear interpolation.

Step 405: The wireless terminal generates, based on the bandwidth adjustment value, first and second bandwidth control signals.

The base band processor can generate a control signal based on the determined bandwidth adjustment value, and this control signal is input into the corresponding low pass filter.

Step 406: The wireless terminal adjusts a bandwidth of first and second low pass filters based on first and second bandwidth control signals to reduce the phase mismatch.

In this embodiment, the control signal is input into the corresponding low pass filter. then the low pass filter adjusts its bandwidth based on the control signal, so that the bandwidth difference between the two low pass filters can be reduced, even to zero, thereby reducing the phase mismatch.

For steps 405 and 406, any known digital processing method for generating bandwidth control signals based on the bandwidth adjustment value may be used and any low pass filters that can adjust bandwidths based on an input control signal may be used. A specific embodiment for implementing steps 405 and 406 is provided here. It should be noted that this specific embodiment is not the only example.

FIG. 5 shows an illustrative structure of an example low pass filter. It can be seen from FIG. 5, the low pass filter comprises a Biquad filter and an Active-RC filter. The bandwidth adjustment signal (bandwidth control signal) is input into both of the Biquad filter and the Active-RC filter, wherein the bandwidth adjustment signal could be the first bandwidth adjustment control signal and the second bandwidth adjustment control signal in this embodiment. In another embodiment, the bandwidth adjustment signal is input into only one of the Biquad filter and the Active-RC filter.

In the prior art, there are many kinds of LPFs. Embodiments of the present invention can be applied to any kinds of LPFs. FIG. 5 shows an illustrative structure of an example low pass filter. Both of the first and second LPFs can be such a LPF shown in FIG. 5, or can be other kind of low pass filters.

Figure 7:
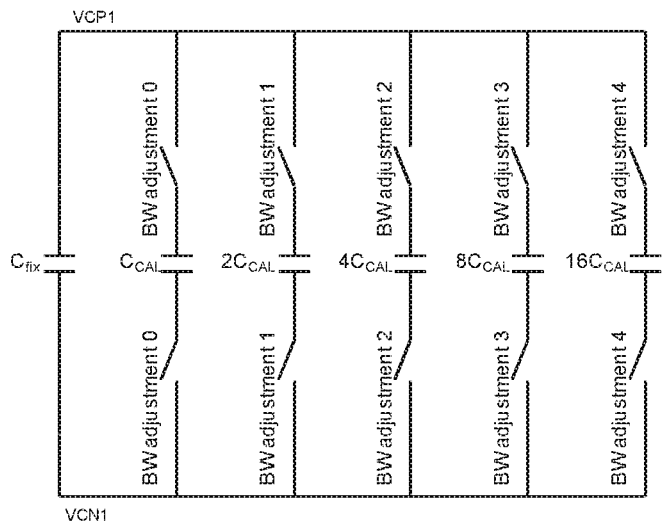
FIG. 7 shows an simulation result between the IQ gain mismatch vs. frequency.

FIG. 6 shows an illustrative structure of an example filter in the low pass filter. More specifically, FIG. 6 shows an example of the filters in FIG. 5. It can be seen that there are a plurality of capacitances in the filters, for examples, one C1 and two C2 in FIG. 6. In order to implement bandwidth adjustment, embodiments of the present invention improve the low pass filters by replacing a single capacitance by a plurality of capacitances connected in parallel, which is called as a capacitance array. FIG. 7 shows an illustrative structure of an example capacitance array. One capacitance array in embodiments comprises at least two parallel capacitances, and at least one of the parallel capacitances is connected with one switch in serial at one side or is connected with two capacitances in serial at both sides, so that the at least one of the parallel connected capacitances can be switched on or switched off. Preferably, at least one of the parallel connected capacitances is not connected with a switch since a capacitance is necessary for the filter.

It should be noted that the capacitance array can replace one or more of single capacitance in the filters shown in FIG. 6, and also all the capacitances shown in FIG. 6 can be replaced. For example, all of C1 and two C2 in FIG. 6 can be capacitance arrays shown in FIG. 7, or only C1 is a capacitance array shown in FIG. 7, or the two C2 are two capacitance arrays shown in FIG. 7 but C1 is a single capacitance. A person skilled in the art could apply the principle of the embodiments as necessary.

In order to implement the bandwidth adjustment in step 406, the first and second low path filters separately switches off or switches on, based on the first and second bandwidth control signals respectively corresponding to the first and second low pass filters, at least one of a plurality of parallel connected capacitances in the first and second low pass filters to adjust the bandwidth of each of first and second low pass filters.

In particular, in present embodiment, the first bandwidth control signal is input into the first low pass filter, and the second bandwidth control signal is input into the second low pass filter. The bandwidth control signal controls the switches connected with the capacitances in serial so as to control the capacitances connected with the other parts of the low pass filter or disconnected with the low pass filter, thereby adjusting the bandwidth of the low pass filter.

In the example of FIG. 7, a capacitance array comprises 6 parallel connected capacitances, wherein each of 5 capacitances is connected with two switches, and the two switches are connected at the both sides of the capacitance, such that the 5 capacitances can be connected or disconnected with the other parts of the low pass filter to enable the bandwidth control. The bandwidth adjustment control signal is used to control the switches. It should be noted that the values of the different capacitances can be same or different. For a purpose of different accuracy, the different capacitances can be different and can be 2 times increased. For example, in FIG. 7, the 5 capacitances are $C_{CAL}$, $2C_{CAL}$, $4C_{CAL}$, $8C_{CAL}$, and $16C_{CAL}$, respectively. Each pair of switches at both sides of one capacitance is controlled by the bandwidth adjustment control signal. In addition, the bandwidth adjustment control signal can be a serial of binary bits, and each bit controls one pair of the switches connected at both sides of the one capacitance. For example, if the bandwidth adjustment control signal is 01101, then the switches connected with $C_{CAL}$ and $8C_{CAL}$ are switched off and the other three capacitances are switched on, so that the bandwidth of the low pass filter can be controlled as necessary.

It should be mentioned that although each of the 5 capacitances in the example of FIG. 7 are connected with two switches, there could be only one switch connected with one capacitance in practice as well.

In order to implement the above method, the present embodiment further provides a corresponding terminal device. The terminal device comprises: a first circuitry comprising in-phase and quadrature phase low pass filters of in-phase and quadrature phase paths, respectively, and a digital base band circuitry coupled with the first circuitry.

In particular, the first circuitry generates a radio frequency signal from a first path that includes the in-phase and quadrature phase paths, respectively.

The digital base band circuitry produces a decomposed signal having in-phase and quadrature phase components in digital form based on the radio frequency signal, determines a phase mismatch between the in-phase and quadrature phase components, generates a bandwidth adjustment value based on the determined phase mismatch, and generates, based on the bandwidth adjustment value, first and second bandwidth control signals.

The first and second low pass filters receive the first and second bandwidth control signals respectively, and respectively adjust a bandwidth of the first and second low pass filters to reduce the phase mismatch based on the first and second bandwidth control signals.

It should be noted that the terminal device is provided for implementing the method above. Thus, the same description and functions can also be used in the terminal device in present embodiment. The same description will not be repeated.

The above embodiment applies a bandwidth control mechanism to reduce a bandwidth difference between the LPF in the I path and the LPF in the Q path, thus reducing the phase mismatch, and also reducing the frequency dependent image distortion that caused by the bandwidth difference. In addition, the present embodiment generates two bandwidth adjustment control signals to respectively control the two low pass filters, which enables the low pass filters independently adjust their bandwidths, thereby providing a flexible mechanism.

The structure of the low pass filter can refer to the above embodiment.

In addition, the digital base band circuitry can further comprise an IQ path bandwidth adjustment estimator and a gain and phase mismatch estimation component as described above. The gain and phase mismatch estimation component determines a phase mismatch between the in-phase and quadrature phase components. Then the IQ path bandwidth adjustment estimator can utilize above linear interpolation method and calibration result to generate the two bandwidth adjustment control signals.

The first low pass filter and the second low pass filter then respectively control the switch connected with the at least one capacitance to enable the bandwidth control of the low pass filter. As such, each of the first and second low pass filters comprise a plurality of parallel connected capacitances, and at least one capacitance of the plurality of the parallel connected capacitances connected with one switch or two switches on both side of the at least one capacitance in series, wherein the first and second low pass filters are configured to: switch-on or switch-off, based on the first and second bandwidth control signals respectively corresponding to the first and second low pass filters, one switch or two switches connected with the at least one of a plurality of parallel connected capacitances in the first and second low pass filters to adjust the bandwidth of each of first and second low pass filters. In above embodiment, the wireless terminal generates two bandwidth control signals based on the bandwidth adjustment value, namely, first and second bandwidth control signals. The two bandwidth control signals are input into the two low pass filters (LPFs) in in-phase path and quadrature path respectively. And the two LPFs adjust its bandwidth based on the input bandwidth control signal independently to reduce the bandwidth difference between the two LPFs, and further reduce the phase mismatch. In addition, the two LPFs adjust its bandwidth independently, thereby the adjustment is flexible and the digital baseband processor can control the two LPFs flexibly.

Figure 8:
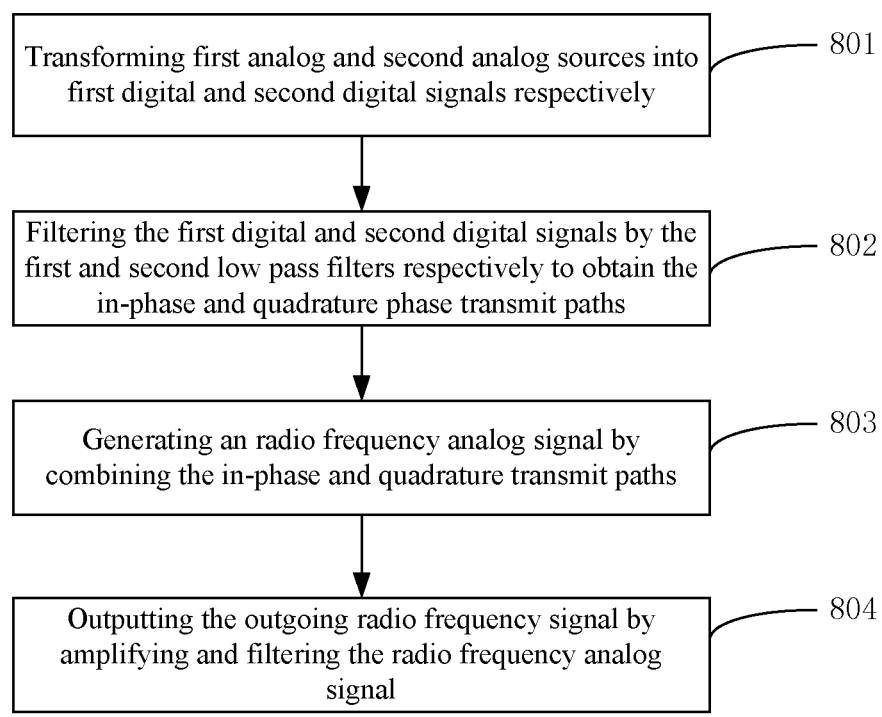
FIG. 8 shows an simulation result between the IQ phase mismatch vs. frequency.

FIG. 8 shows an illustrative flow chart of an implementation manner of step 401 in FIG. 4. Step 401 of generating the radio frequency signal may comprise following steps:

Step 801: The wireless terminal transforms first analog and second analog sources into first digital and second digital signals respectively.

Step 802: The wireless terminal filters the first digital and second digital signals by the first and second low pass filters respectively to obtain the in-phase and quadrature phase transmit paths.

Step 803: The wireless terminal generates a radio frequency analog signal by combining the in-phase and quadrature transmit paths.

Step 804: The wireless terminal outputting the outgoing radio frequency signal by amplifying and filtering the radio frequency analog signal from which a feedback signal is generated.

Figure 9:
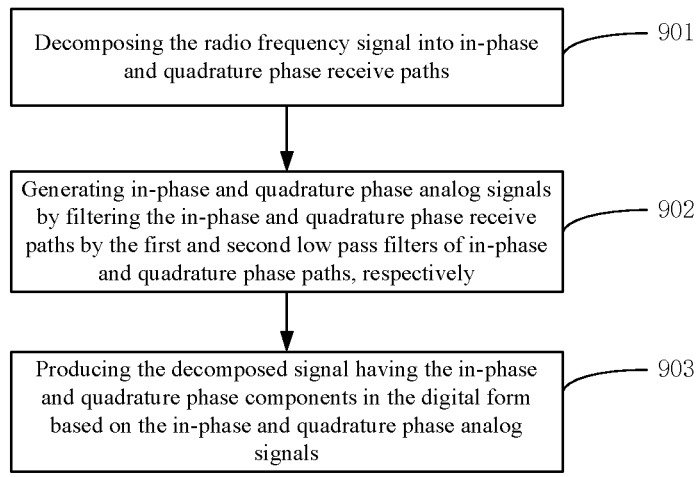
FIG. 9 shows an example calibration measurement.

In the case of the wireless terminal in this embodiment is used at the receiving side, the wireless terminal comprises a continuous wave signal source for generating signals for the purpose of correcting the phase mismatch. FIG. 9 shows an illustrative flow chart of a further implementation manner of step 401 in FIG. 4 for receive operations in which an RF signal is being received. The step 401 of generating the radio frequency signal may comprise following steps:

Step 901: The wireless terminal decomposes the radio frequency signal into in-phase and quadrature phase receive paths.

Step 902: The wireless terminal generates in-phase and quadrature phase analog signals by filtering the in-phase and quadrature phase receive paths by the first and second low pass filters of in-phase and quadrature phase paths, respectively.

Step 903: The wireless terminal produces the decomposed signal having the in-phase and quadrature phase components in the digital form based on the in-phase and quadrature phase analog signals.

Figure 10:
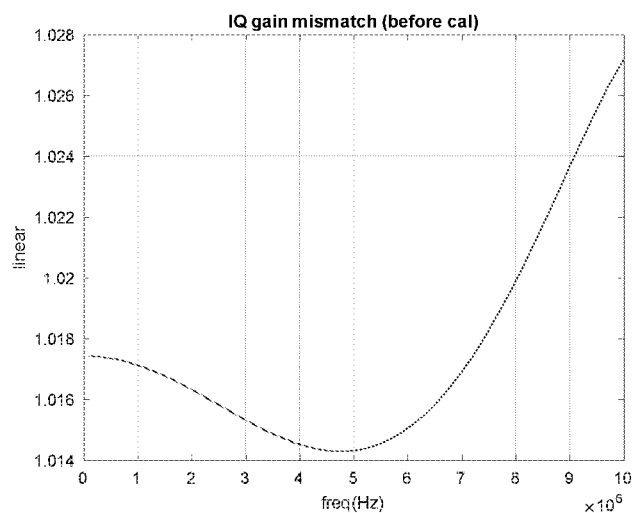
FIG. 10 shows a comparison of image distortion before using calibration of present embodiments and after using calibration of present embodiments.
Figure 11:
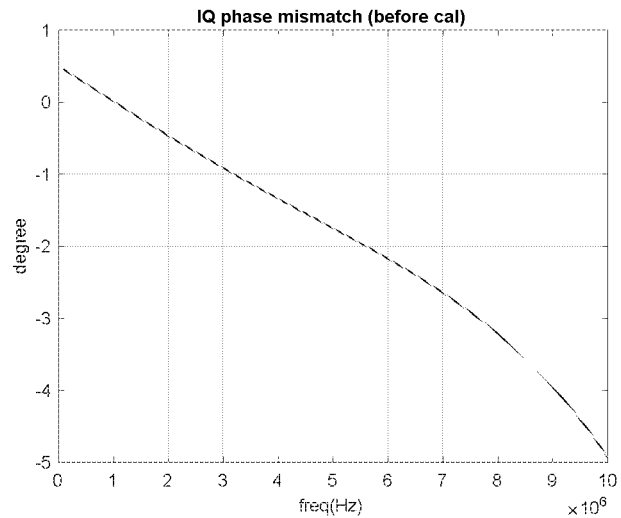
FIG. 11 shows phase mismatch is approximately linearly proportional to the baseband frequency.

FIG. 10 shows a simulation result between the IQ gain mismatch with regard to the frequency increasing using LTE 20 MHz as an example (base band signal frequency up to 9 MHz). FIG. 11 shows a simulation result between the IQ phase mismatch with regard to the frequency increasing using LTE 20 MHz as an example (base band signal frequency up to 9 MHz). It can be seen that for in-band signal, the gain mismatch is small in FIG. 10 and phase mismatch is approximately linearly proportional to the baseband frequency in FIG. 11. Taking advantage of such a linear proportion relationship, the LPF bandwidth change can be designed to be linearly proportional to the IQ bandwidth adjustment code. This enables the use of linear interpolation for IQ bandwidth adjustment estimation, as the diagram shown in FIG. 12.

Figure 12:
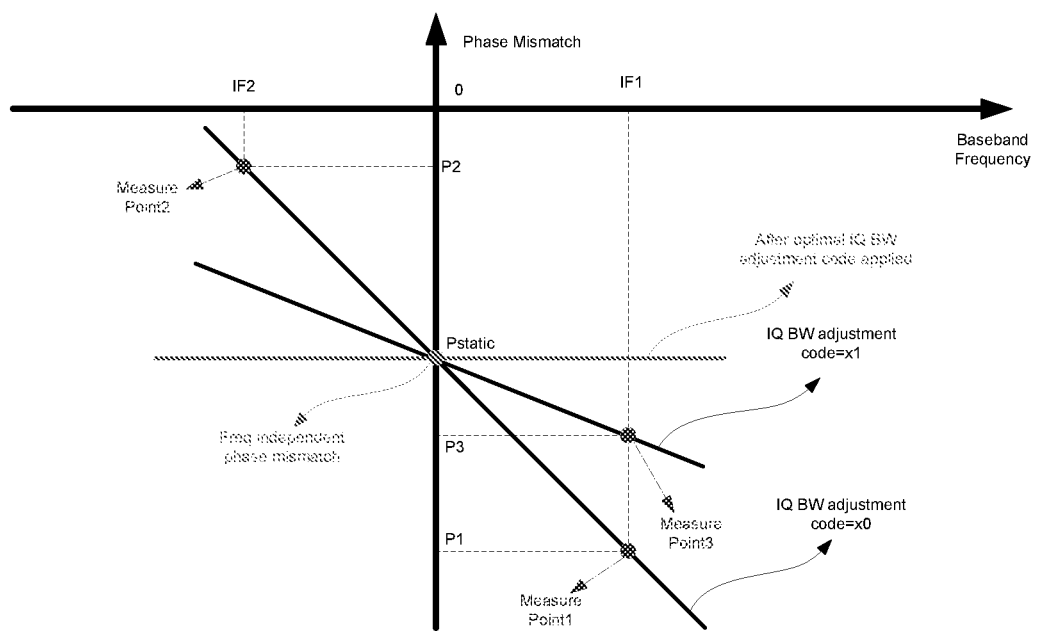
FIG. 12 shows total three measurements are used in the factory calibration phase.

Since the terminal device comprises a continuous wave signal source, any frequency of the continuous wave (CW) tones can be generated from the continuous wave signal source. In this example, 9 MHz is used as an example. FIG. 12 shows an example calibration measurement.

In FIG. 12, total three measurements are used in the factory calibration phase:

1st measurement: test tone freq=IF1, IQ path LPF bandwidth adjustment value=x0;

2nd measurement: test tone freq=IF2, IQ path LPF bandwidth adjustment value=x0; and 3rd measurement: test tone freq=IF1, IQ path LPF bandwidth adjustment value=x1.

Both gain mismatch (G1, G2 and G3) and phase mismatch (P1, P2 and P3) will be measured during the process. As shown in FIG. 7, the IQ path LPF bandwidth mismatch has minimal gain mismatch, which means the measured gain mismatch is just frequency independent gain mismatch.

On the other hand, the measured phase mismatch contains both a frequency independent portion and a frequency dependent portion. This means the two different phase mismatches have to be separated, the frequency independent phase mismatch combining with frequency independent gain mismatch will be used in the traditional image correction block (frequency independent image correction) and frequency dependent phase mismatch will be used for optimal IQ bandwidth adjustment estimation.

In present embodiment, the base band processor uses linear interpolation of baseband signal frequency vs. phase mismatch to yield the frequency independent phase mismatch (static phase mismatch). IQ bandwidth adjustment value vs. phase mismatch combining with static phase mismatch subtracted out enables the estimation of the optimal IQ bandwidth adjustment value.

The calibration procedure comprises:

1) Measuring the gain mismatch and phase mismatch under three baseband frequency (continuous wave tones) and IQ path LPF bandwidth adjustment codes combinations:

1st measurement: test tone frequency=IF1, IQ path LPF bandwidth adjustment value=x0, and then the gain mismatch value is G1 and the phase mismatch value is P1;

2nd measurement: test tone frequency=IF2, IQ path LPF bandwidth adjustment value=x0, and then the gain mismatch value is G2 and the phase mismatch value is P2;

3rd measurement: test tone frequency=IF1, IQ path LPF bandwidth adjustment value=x1, and then the gain mismatch value is G3 and the phase mismatch value is P3;

These calculations can be done by the gain and phase mismatch estimation component in the base band processor in one embodiment.

Figure 14:
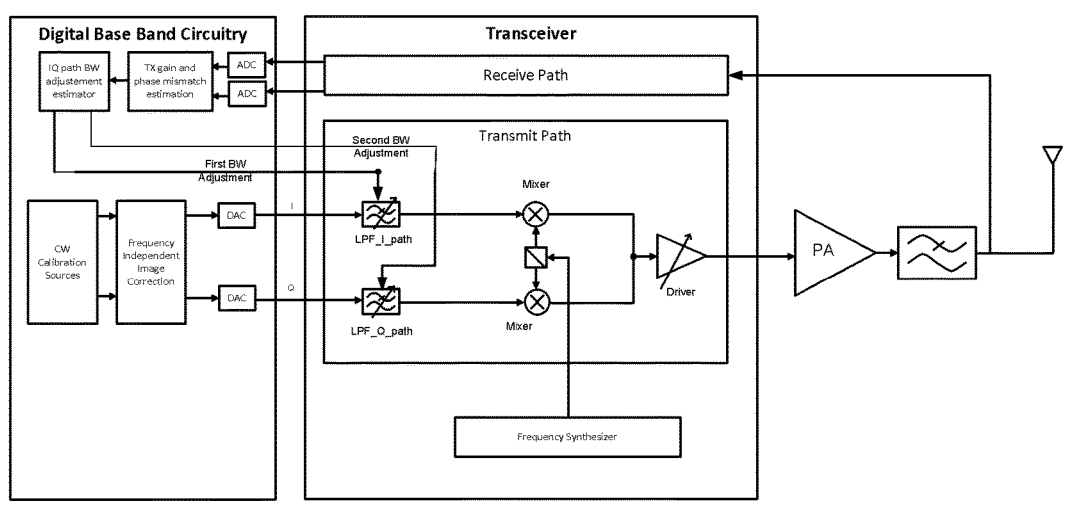
FIG. 14 shows an illustrative structure of a transmitter in a wireless terminal based on the first embodiment of the present invention.
Figure 15:
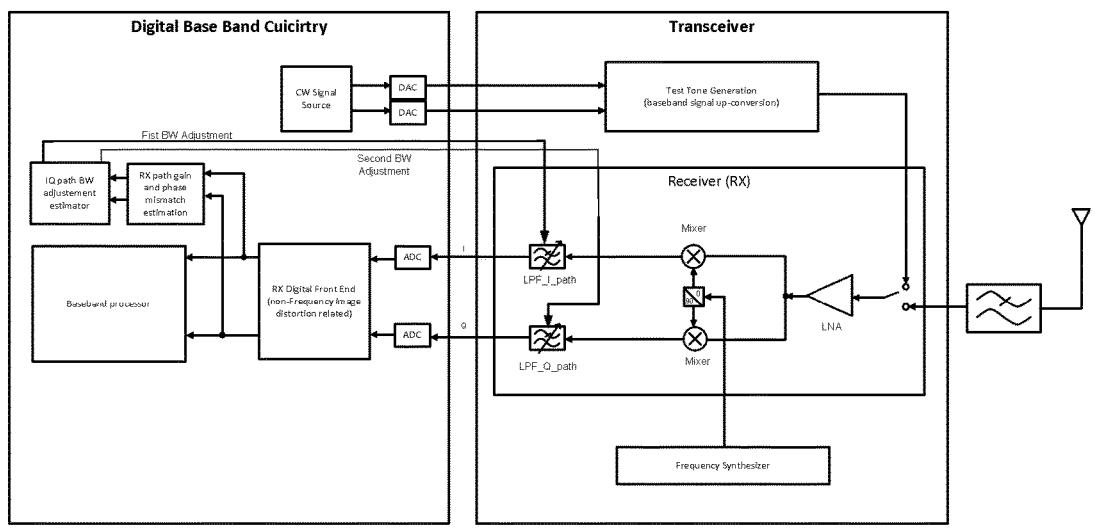
FIG. 15 shows another illustrative structure of a receiver in a wireless terminal based on the first embodiment of the present invention.

2) Estimating the optimal IQ bandwidth adjustment value as follows:

A. The frequency independent gain mismatch is simply G1. Since G2 and G3 value should be very close to G1, G2 and G3 can be neglected;

B. The frequency independent phase mismatch is Pstatic and use linear interpolation to find Pstatic through P1/IF1 and P2/IF2 with target of zero Hz as follows:

Due to the above linear proportion property, when the IQ path LPF bandwidth adjustment value=x1, the phase mismatch value is linearly proportional to the frequency, and thus, the line comprising the measurement point 1 and the measurement point 2 is obtained. And Pstatic can be obtained through linear interpolation as follows:

For measurement point 1 in FIG. 14, $P1=b1*IF1+b0$;

For measurement point 1 in FIG. 14, $P2=b1*IF2+b0$;

Solving the equations above, the value of b1 and b0 can be obtained.

Then the Pstatic value at IF=0 can be obtained as follows:

$$P\text{static}=b1*0+b0=>P\text{static}=b0$$

C. Estimating the optimal IQ path bandwidth adjustment value by linear interpolation from P1/x0 and P3/x1 with target Pstatic value.

The IQ path bandwidth adjustment value is also linearly proportional to the phase mismatch. Due to this property, any IQ path bandwidth adjustment value for different Pstatic using linear interpolation.

For example,

For measurement point 1 in FIG. 14, $P1=a1*x0+a0$;

For measurement point 3 in FIG. 14, $P3=a1*x1+a0$;

Solving the equations above, the value of a1 and a0 are obtained.

Then an optional IQ path bandwidth adjustment code (x_optimal) to achieve phase of Pstatic can be obtained as follows:

$$\text{Since } P\text{static}=a1*x\_\text{optimal}+a0, \text{ then } x\_\text{optimal}=(P\text{static}-a0)/a1.$$

3) Applying the optimal IQ bandwidth adjustment value to the transceiver accordingly during real operation.

2) and 3) can be done by an IQ path bandwidth adjustment estimator in the base band processor.

It should be mentioned that the IQ path bandwidth adjustment estimator can generate the first and second bandwidth control signals based on the determined optimal IQ bandwidth adjustment value.

Certainly, the IQ path bandwidth adjustment estimator and the gain and phase mismatch estimation component can be one component.

Figure 13:
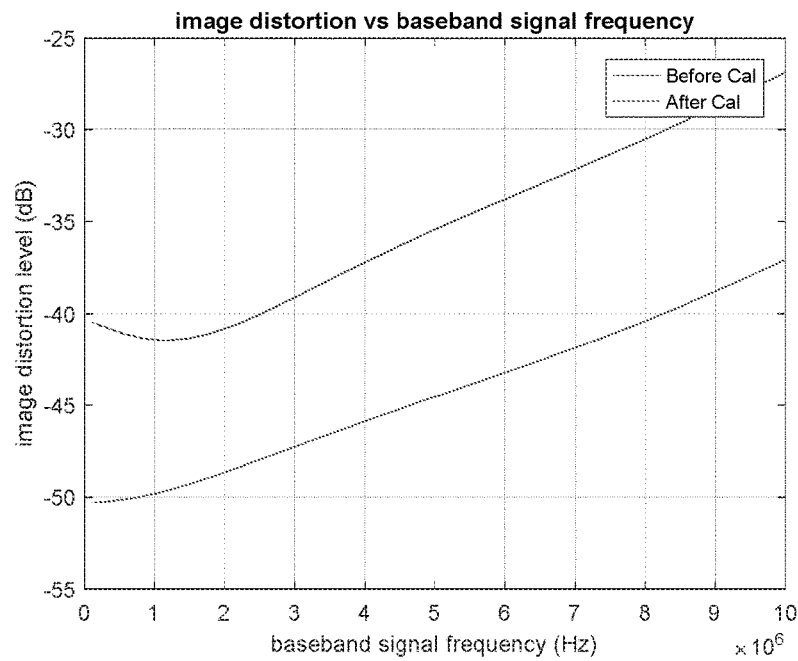
FIG. 13 shows a simulation result of image distortion vs. base band signal frequency using LTE 20MHz as an example.

FIG. 13 shows a simulation result of image distortion vs. base band signal frequency using LTE 20 MHz as an example (baseband signal frequency up to 9 MHz). The plot shows the image distortion level before and after calibration. The blue line (upper line) shows the image distortion level before calibration, and the red line (below line) shows the image distortion level after calibration. So significant frequency dependent image distortion level reduction is observed through the above method.

FIG. 14 shows an illustrative structure of a transmitter in a wireless terminal based on the first embodiment of the present invention. In a case that the terminal device used at a transmitting side, as shown in FIG. 14, the first circuitry is a transmitting circuitry, the first path is a transmit path in a transmitter of the terminal device, the radio frequency signal is an outgoing signal of the transmitter of the terminal device, and the decomposed signal is a feedback signal of the radio frequency signal, wherein the digital base band circuitry is configured to produce the decomposed signal as follows: producing, from a second path, the decomposed feedback signal having the in-phase and quadrature phase components in digital form based on the outgoing radio frequency signal, wherein the second path is a receive path in the transmitter of the terminal device.

In addition, in such a case, as shown in FIG. 14, the transmitting circuitry further comprises: first and second analog to digital converters, and a combining circuitry. The first analog to digital converter is coupled with the first low pass filter, and the second analog to digital converter is coupled with the second low pass filter, and the first and second low pass filters are coupled with the combining circuitry. In the embodiment shown in FIG. 14, the first low pass filter can be any one of the LPFs in the I path or the Q path. As shown in FIG. 14, the digital base band circuitry two ADCs, a transmit gain and phase mismatch estimation component, and an IQ path bandwidth adjustment estimator. The first circuitry is a transmitting circuitry, the transmitting circuitry comprises a transmit path and a receive path, wherein the first path is the transmit path, and the radio frequency signal is an outgoing signal of the transmitter of the wireless terminal.

It should be noted that the method how the IQ path bandwidth adjustment estimator or the baseband processor generates the bandwidth adjustment value can refer to the above embodiment.

The first and second analog to digital converters transform first analog and second analog sources into first and second digital signals respectively; the first and second low pass filters filter the first and second digital signals respectively to obtain the in-phase and quadrature phase transmit paths; and the combining circuitry is configured to generate a radio frequency analog signal by combining the in-phase and quadrature transmit paths; and the transceiver further comprises an amplifier coupled with a third filter, wherein the transmitting circuitry is coupled with the amplifier, wherein the amplifier amplifies the radio frequency analog signal; and the third filter generates the outgoing radio frequency signal by filtering the amplified radio frequency analog signal.

That is, the outgoing radio frequency signal is fed back to the digital base band circuitry through a receive path, and is converted into digital signals of in-phase path and quadrature path respectively. Then a gain and phase mismatch estimator, e.g., an IQ path bandwidth adjustment estimator shown in FIG. 14, estimates the phase mismatch value, for example bandwidth difference. The IQ path bandwidth adjustment estimator can further generate the first bandwidth adjustment signal, namely, the first bandwidth control signal, and the second bandwidth adjustment signal, namely, the second bandwidth control signal, respectively.

For example, the outgoing radio frequency signal is fed back to transmitting circuitry through the receive path, and is decomposed into two paths, that is, in-phase path and quadrature phase path in analog form. Then the decomposed analog in-phase path and quadrature phase signals are converted into digital form by ADCs in in-phase path and quadrature phase path, respectively to produce a decomposed signal having in-phase and quadrature phase components in digital form. Then the transmit gain and phase mismatch estimation component determines a phase mismatch between the in-phase and quadrature phase components, and the IQ path bandwidth adjustment estimator generates a bandwidth adjustment value based on the determined phase mismatch, and generates, based on the bandwidth adjustment value, a first control signal.

The structures of the LPFs can refer to the above embodiments. It will not be repeated herein. Further alternative embodiments are also provided.

Figure 16:
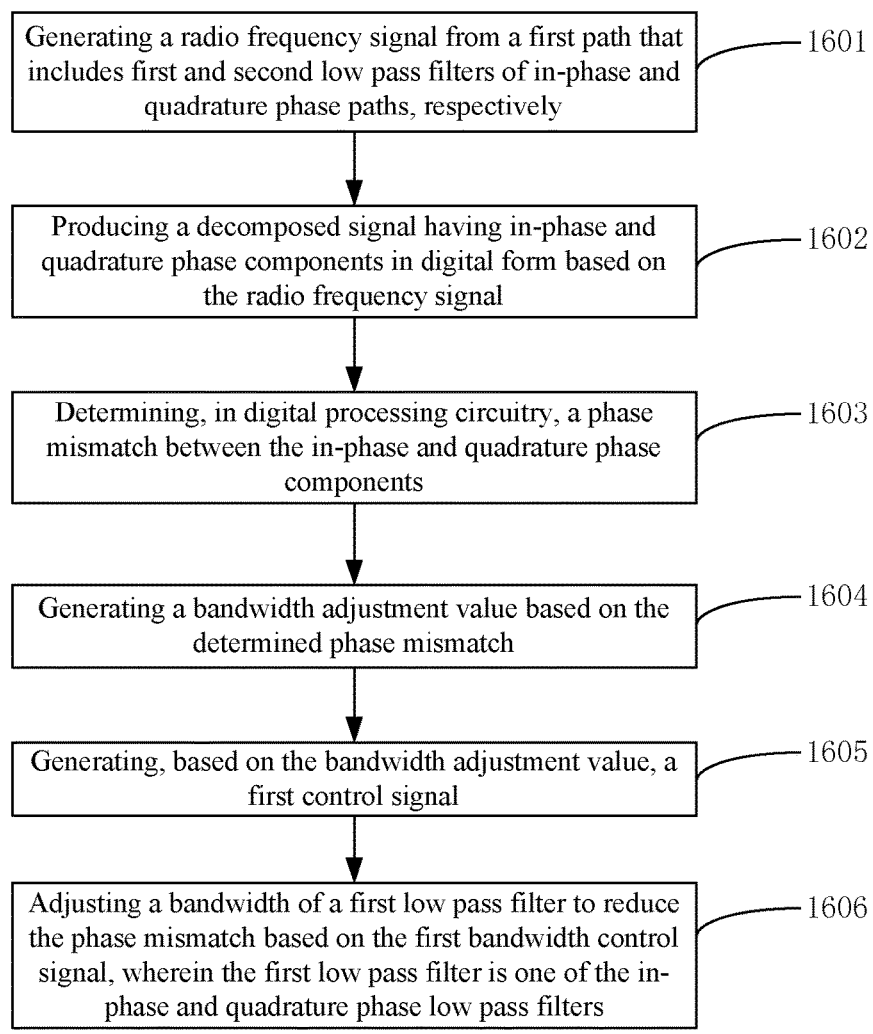
FIG. 16 shows an illustrative flow chart of an alternative method in a second embodiment.
Figure 17:
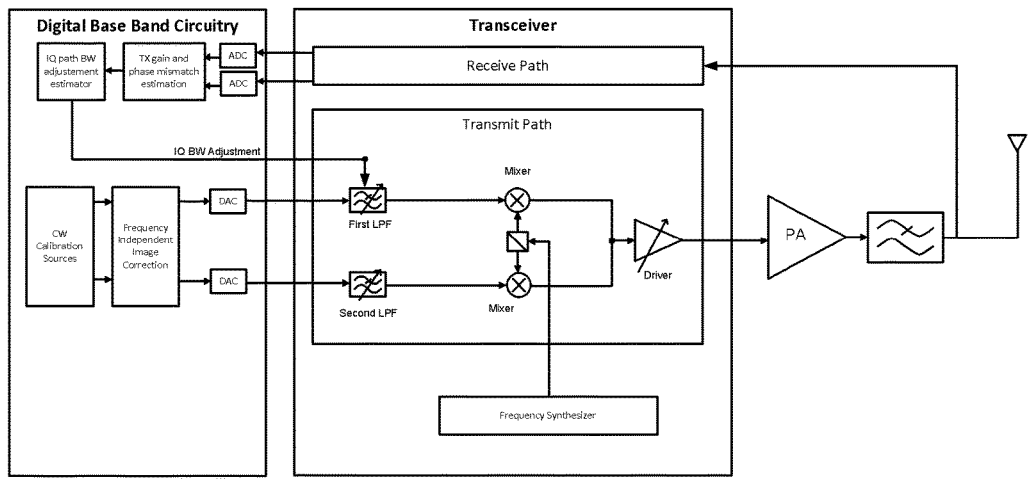
FIG. 17 shows another illustrative structure of a transmitter in a wireless terminal based on the second embodiment of the present invention.
Figure 18:
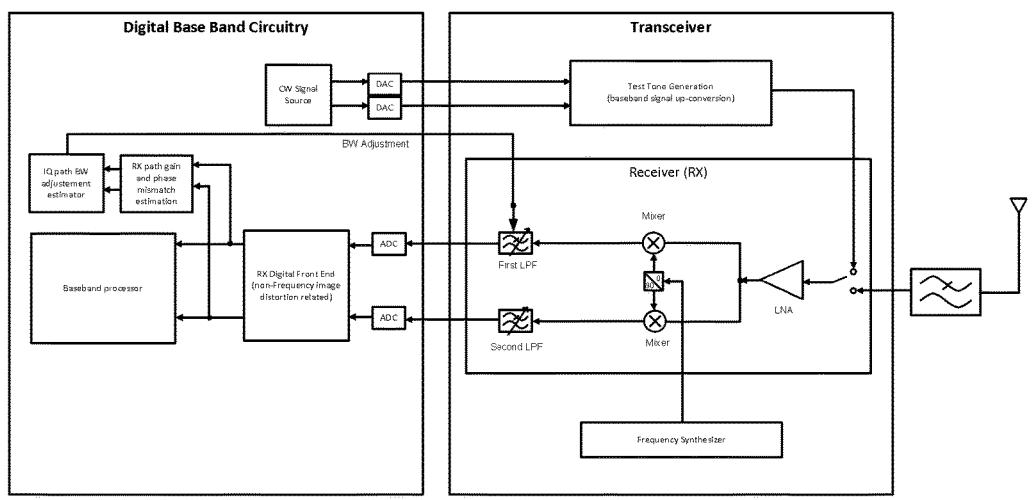
FIG. 18 shows another illustrative structure of a receiver in a wireless terminal based on the second embodiment of the present invention.

An alternative embodiment is shown in FIGS. 16 to 18. FIG. 16 shows an illustrative flow chart of an alternative method in a second embodiment. The difference between this alternative embodiment is in that only one control signal is generated and only one of the two low pass filters in the in-phase path and quadrature path adjust its bandwidth to adapt to the bandwidth of the other one.

For example, as shown in FIG. 16, in Step 1605 of the present alternative embodiment, the terminal device generates, based on the bandwidth adjustment value, a first control signal; and in Step 1606, the terminal device adjusts a bandwidth of a first low pass filter to reduce the phase mismatch based on the first bandwidth control signal, wherein the first low pass filter is one of the in-phase and quadrature phase low pass filters.

Other steps from steps 1601 to 1604 can refer to the illustration in above embodiments.

FIG. 17 shows an embodiment of an illustrative structure of a transmitter in a wireless terminal. The first low pass filter can be any one of the LPFs in the I path or the Q path. As shown in FIG. 17, the digital base band circuitry two ADCs, a transmit gain and phase mismatch estimation component, and an IQ path bandwidth adjustment estimator.

The first low pass filter adjusts a bandwidth of the first low pass filter based on the first control signal. For example, if the bandwidth of the second low pass filter is larger than that of the first low pass filter, the first low pass filter increases its bandwidth to match with that of the second low pass filter. If the bandwidth of the second low pass filter is smaller than that of the first low pass filter, the first low pass filter decreases its bandwidth to match with that of the second low pass filter. Therefore, the bandwidth difference can be reduced, even to 0, and the phase mismatch caused by the bandwidth difference can be eliminated.

FIG. 18 shows an embodiment of an illustrative structure of a receiver in a wireless terminal. The principle is similar as that described above. So it will not be repeated herein.

It should be mentioned that the other components or steps of this alternative embodiment are same as that in above embodiments, and thus the illustration can also be applied in this embodiment.

Figure 19:
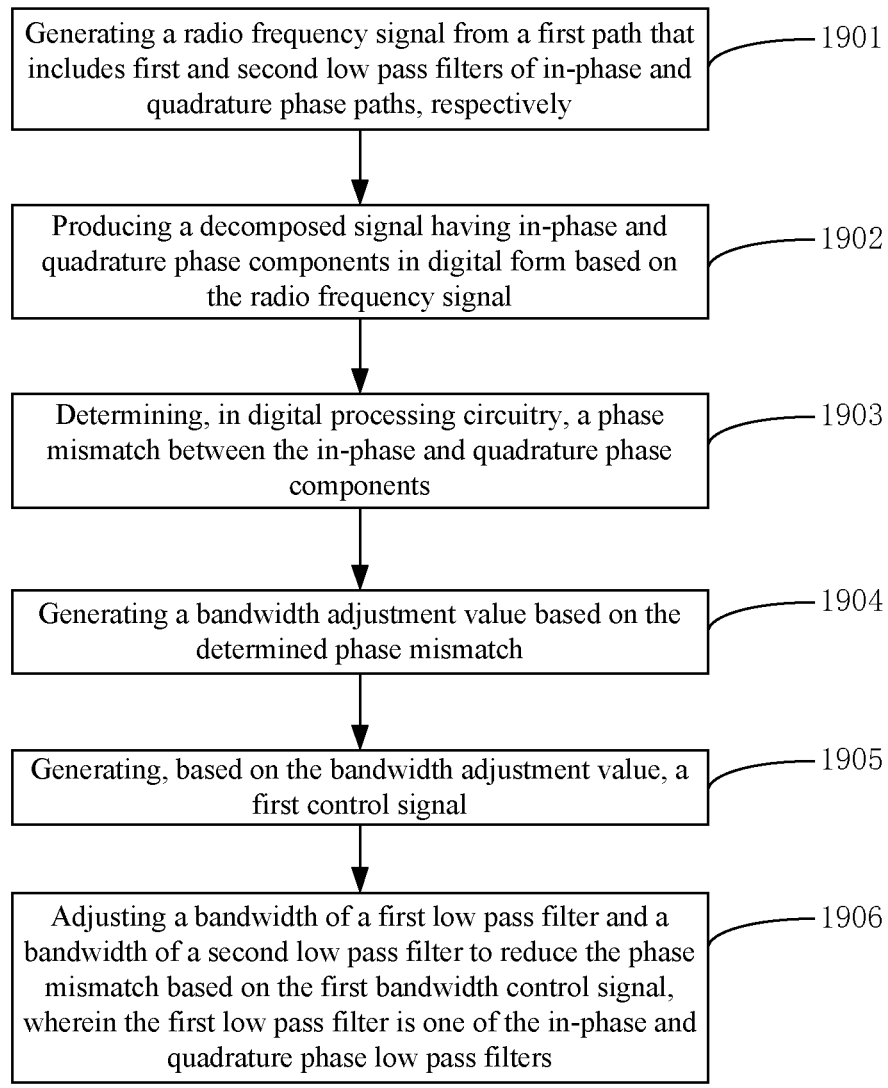
FIG. 19 shows an illustrative flow chart of a further alternative method in a third embodiment.
Figure 20:
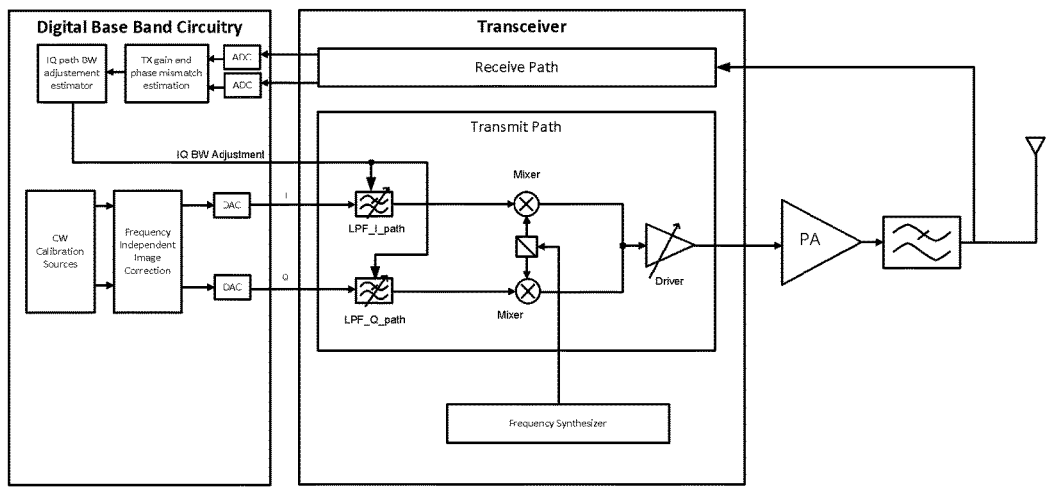
FIG. 20 shows another illustrative structure of a transmitter in a wireless terminal based on the third embodiment of the present invention.
Figure 21:
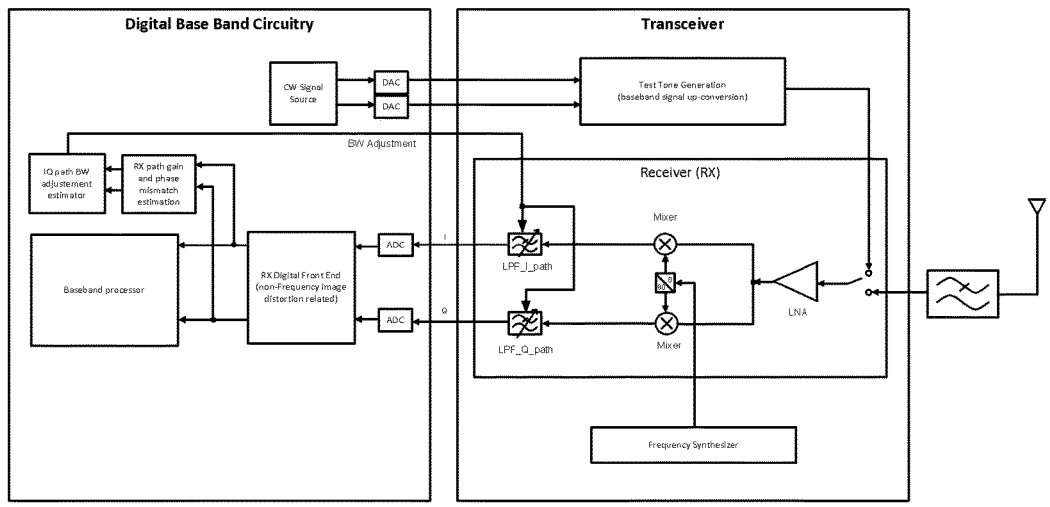
FIG. 21 shows another illustrative structure of a receiver in a wireless terminal based on the third embodiment of the present invention.

FIGS. 19 to 21 shows a further alternative embodiment. In this embodiment, the first control signal can also be applied to both of the two low path filters in the I path and the Q path. That is, the difference between this further alternative embodiment is in that only one control signal is generated and both of the two low pass filters in the in-phase path and quadrature path adjust their bandwidth to reduce the bandwidth difference.

FIG. 19 shows an illustrative flow chart of a further alternative method in a third embodiment. For example, in Step 1905 of the present alternative embodiment, the terminal device generates, based on the bandwidth adjustment value, a first control signal; and in Step 1906, the terminal device adjusts bandwidths of the first and second low pass filters to reduce the phase mismatch based on the first bandwidth control signal.

Therefore, the difference between the embodiments shown in FIGS. 16 and 19 is that only one control signal is generated, however, in the embodiments shown in FIG. 16, only the bandwidth of one LPF is adjusted based on this control signal, and in the embodiments shown in FIG. 19, both of the bandwidths of two LPFs are adjusted based on this control signal.

In this embodiment, as shown in FIGS. 20 and 21, the second low pass filter adjusts a bandwidth of the second low pass filter to reduce the phase mismatch based on the first bandwidth control signal as well, wherein the first low pass filter is one of the in-phase and quadrature phase low pass filters and the second low pass filter is another one of the in-phase and quadrature phase low pass filters.

The same components in FIGS. 20 and 21 are the same as that in the above embodiments and will not be repeated. The difference between the embodiments shown in FIGS. 17 and 20 is that in FIG. 17, only one of the two low path filters adjusts the bandwidth based on the control signal determined based on the phase mismatch. In FIG. 20, this control signal can be applied to both of the low pass filters, and both of these two low pass filters adjust their own bandwidth. That is, in FIG. 20, the same control signal can be applied to both of the low path filters in I path and Q path. One of the two low path filters adjusts its bandwidth by a positive half value of the total difference between the bandwidths of the two low path filters, and the other of the two low path filters adjusts its bandwidth by a negative half value of the total difference between the bandwidths of the two low path filters. For example, if the bandwidth of the second low pass filter is larger than that of the first low pass filter, the first low pass filter increases its bandwidth and the second low pass filter decreases its bandwidth, so that the bandwidth of the first low pass filter can be match with that of the second low pass filter. If the bandwidth of the second low pass filter is smaller than that of the first low pass filter, the first low pass filter decreases its bandwidth, and the second low pass filter increases its bandwidth.

In a specific example, if the bandwidth of the second low pass filter is larger than that of the first low pass filter by 1, the first low pass filter increases its bandwidth 0.5 and the second low pass filter decrease its bandwidth 0.5, so that the bandwidth of the second low pass filter matches with that of the first low pass filter.

Other operations of this embodiment can also refer to the above embodiments.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that peradio frequencyorm substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method in a terminal device, comprising:
generating a radio frequency (RF) signal from a first path that includes first and second low pass filters of in-phase and quadrature phase paths, respectively, wherein the first path is a transmit path;
generating a feedback signal of the radio frequency signal, wherein the feedback signal has in phase and quadrature phase components in digital form based on the radio frequency signal;
determining a phase mismatch between the in-phase and quadrature phase components of the feedback signal;
generating a bandwidth adjustment value based on the determined phase mismatch of the RF signal;
generating, based on the bandwidth adjustment value, first and second bandwidth control signals; and
adjusting a bandwidth of first and second low pass filters based on the first and second bandwidth control signals to reduce the phase mismatch based on the first and second bandwidth control signals.

2. The method of claim 1, wherein the adjusting the bandwidth comprises:
separately switching-off or switching on, based on the first and second bandwidth control signals respectively corresponding to the first and second low pass filters, at least one of a plurality of parallel connected capacitances operably disposed within the first and second low pass filters to adjust the bandwidth of each of first and second low pass filters.

3. The method of claim 1, wherein the first path is a transmit path in a transmitter of the terminal device, the radio frequency signal is an outgoing signal of the transmitter of the terminal device wherein
the generating the feedback signal comprises:
generating, from a second path, the feedback signal having the in-phase and quadrature phase components in digital form based on the outgoing radio frequency signal, wherein the second path is a receive path in the transmitter of the terminal device.

4. The method of claim 3, wherein the generating the radio frequency signal comprises:
transforming first analog and second analog sources into first digital and second digital signals respectively;
filtering the first digital and second digital signals by the first and second low pass filters respectively to obtain the in-phase and quadrature phase transmit paths;
generating a radio frequency analog signal by combining the in-phase and quadrature transmit paths; and
outputting the outgoing radio frequency signal by amplifying and filtering the radio frequency analog signal.

5. A terminal device, comprising:
a first circuitry comprising first and second low pass filters of in-phase and quadrature phase paths, respectively, and
a digital base band circuitry coupled with the first circuitry, wherein
the first circuitry is configured to: generate a radio frequency (RF) signal from a first path that includes the in-phase and quadrature phase paths, respectively, wherein the first path is a transmit path;
the digital base band circuitry is configured to:
generate a feedback signal of the radio frequency signal, wherein the feedback signal has in phase and quadrature phase components in digital form based on the radio frequency signal;
determine a phase mismatch between the in-phase and quadrature phase components of the feedback signal;
generate a bandwidth adjustment value based on the determined phase mismatch of the RF signals; and
generate, based on the bandwidth adjustment value, first and second bandwidth control signals; and
the first and second low pass filters are configured to:
receive the first and second bandwidth control signals respectively, and respectively adjust a bandwidth of the first and second low pass filters to reduce the phase mismatch based on the first and second bandwidth control signals.

6. The terminal device of claim 5, wherein each of the first and second low pass filters comprise a plurality of parallel connected capacitances, and at least one capacitance of the plurality of the parallel connected capacitances connected with one switch or two switches on both side of the at least one capacitance in series, wherein the first and second low pass filters are configured to: switch-on or switch-off, based on the first and second bandwidth control signals respectively corresponding to the first and second low pass filters, one switch or two switches connected with the at least one of a plurality of parallel connected capacitances operably disposed within in the first and second low pass filters to adjust the bandwidth of each of first and second low pass filters.

7. The terminal device of claim 5, wherein the first circuitry is a transmitting circuitry, the first path is a transmit path in a transmitter of the terminal device, the radio frequency signal is an outgoing signal of the transmitter of the terminal device, wherein the digital base band circuitry is configured to generate the feedback signal as follows:

generating, from a second path, the feedback signal having the in-phase and quadrature phase components in digital form based on the outgoing radio frequency signal, wherein the second path is a receive path in the transmitter of the terminal device.

8. The terminal device of claim 7, wherein the transmitting circuitry further comprises: first and second analog to digital converter, and a combining circuitry, wherein the first analog to digital converter coupled with the first low pass filter, and the second analog to digital converter coupled with the second low pass filter, and the first and second low pass filters are coupled with the combining circuitry, wherein the first and second analog to digital converter are configured to transform first analog and second analog sources into first digital and second digital signals respectively;

the first and second low pass filters are configured to filter the first digital and second digital signals respectively to obtain the in-phase and quadrature phase transmit paths; and the combining circuitry is configured to generate a radio frequency analog signal by combining the in-phase and quadrature transmit paths; and the transceiver further comprises an amplifier coupled with a third filter, wherein the transmitting circuitry is coupled with the amplifier, wherein the amplifier is configured to amplify the radio frequency analog signal; and the third filter is configured to generate the outgoing radio frequency signal by filtering the amplified radio frequency analog signal.

9. The terminal device of claim 5, wherein the first path is a receive path in a receiver of the terminal device, the first circuitry is a receiving circuitry which comprises first and second mixers corresponding to the in-phase and quadrature phase paths respectively, the first mixer is coupled to the first low pass filter of in-phase paths, the second mixer is coupled to the second low pass filter of quadrature phase path, and the radio frequency signal is generated from a signal generated by a signal source in the receiver of the terminal device, wherein the first circuitry is configured to generate the radio frequency signal as follows:

the first and second mixers respectively generating in-phase and quadrature phase radio frequency signals; and producing, by the first and second low pass filters respectively from the receive path, the radio frequency signal having the in-phase and quadrature phase components based on the in-phase and quadrature phase radio frequency signals.

10. A terminal device, comprising:

a first circuitry comprising in-phase and quadrature phase low pass filters of in-phase and quadrature phase paths, respectively, and a digital base band circuitry coupled with the first circuitry, wherein the first circuitry is configured to: generate a radio frequency (RF) signals from a first path that includes the in-phase and quadrature phase paths, respectively, wherein the first path is a transmit path;

the digital base band circuitry is configured to:

generate a feedback signal of the radio frequency signal, wherein the feedback signal have in-phase and quadrature phase components in digital form;

determine a phase mismatch between the in-phase and quadrature phase components of the feedback signal;

generate a bandwidth adjustment value based on the determined phase mismatch of the RF signal; and generate, based on the bandwidth adjustment value, a first control signal;

a first low pass filter is configured to: adjust a bandwidth of the first low pass filter to reduce the phase mismatch based on the first bandwidth control signal, wherein the first low pass filter is one of the in-phase and quadrature phase low pass filters.

11. The terminal device of claim 10, wherein the first low pass filter comprises a plurality of parallel connected capacitances, and at least one capacitance of the plurality of the parallel connected capacitances connected with one switch or two switches on both side of the at least one capacitance in series, wherein the first low pass filter is configured to: switch-on or switch-off, based on the first bandwidth control signal, the one switch or two switches connected with the at least one of a plurality of parallel connected capacitances operably disposed within in the first low pass filter to adjust the bandwidth of the first low pass filter.

12. The terminal device of claim 10, wherein a second low pass filter is configured to: adjust a bandwidth of the second low pass filter to reduce the phase mismatch based on the first bandwidth control signal, wherein the second low pass filter is another one of the in-phase and quadrature phase low pass filters.

13. The terminal device of claim 12, wherein the second low pass filter comprises a plurality of parallel connected capacitances, and at least one capacitance of the plurality of the parallel connected capacitances connected with one switch or two switches on both side of the at least one capacitance in series, wherein the second low pass filter is configured to: switch-on or switch-off, based on the first control signal, the one switch or two switches connected with the at least one of a plurality of parallel connected capacitances operably disposed within in the second low pass filter to adjust the bandwidth of the second low pass filter.

14. The terminal device of claim 10, wherein the first circuitry is a transmitting circuitry, the first path is a transmit path in a transmitter of the terminal device, and the radio frequency signal is an outgoing signal of the transmitter of the terminal device, wherein the digital base band circuitry is configured to generate the feedback signal as follows:

generating, from a second path, the feedback signal having the in-phase and quadrature phase components in digital form based on the outgoing radio frequency signal, wherein the second path is a receive path in the transmitter of the terminal device.

15. The terminal device of claim 14, wherein the transmitting circuitry further comprises: first and second analog to digital converter, and a combining circuitry, wherein the first analog to digital converter coupled with the first low pass filter, and the second analog to digital converter coupled with the second low pass filter, and the first and second low pass filters are coupled with the combining circuitry, wherein the first and second analog to digital converter are configured to transform first analog and second analog sources into first digital and second digital signals respectively;

the first and second low pass filters are configured to filter the first digital and second digital signals respectively to obtain the in-phase and quadrature phase transmit paths; and the combining circuitry is configured to generate a radio frequency analog signal by combining the in-phase and quadrature transmit paths; and the transceiver further comprises an amplifier coupled with a third filter, wherein the transmitting circuitry is coupled with the amplifier, wherein the amplifier is configured to amplify the radio frequency analog signal; and the third filter is configured to generate the outgoing radio frequency signal by filtering the amplified radio frequency analog signal.

16. The terminal device of claim 10, wherein the first path is a receive path in a receiver of the terminal device, the first circuitry is a receiving circuitry which comprises first and second mixers corresponding to the in-phase and quadrature phase paths respectively, the first mixer is coupled to the first low pass filter of in-phase paths, the second mixer is coupled to the second low pass filter of quadrature phase path, and the radio frequency signal is generated from a signal generated by a signal source in the receiver of the terminal device, wherein the first circuitry is configured to generate the radio frequency signal as follows:

the first and second mixers respectively generating in-phase and quadrature phase radio frequency signals; and producing, by the first and second low pass filters respectively from the receive path, the radio frequency signal having the in-phase and quadrature phase components based on the in-phase and quadrature phase radio frequency signals.

* * * * *